United States Patent
Hamlin et al.

(10) Patent No.: US 12,393,222 B2
(45) Date of Patent: Aug. 19, 2025

(54) LOCAL TIME DETERMINATION VIA DAYLIGHT SENSING FOR PROGRAMMABLE CONTROL DEVICES

(71) Applicant: ABL IP Holding, LLC, Conyers, GA (US)

(72) Inventors: Robert W. Hamlin, Monroe, CT (US); Philip S. Gross, Berlin, CT (US); Richard L. Westrick, Jr., Social Circle, GA (US); John Keller, Grayson, GA (US)

(73) Assignee: ABL IP Holding, LLC, Conyers, GA (US)

( * ) Notice: Subject to any disclaimer, the term of this patent is extended or adjusted under 35 U.S.C. 154(b) by 95 days.

(21) Appl. No.: 18/477,495

(22) Filed: Sep. 28, 2023

(65) Prior Publication Data

US 2024/0111328 A1    Apr. 4, 2024

Related U.S. Application Data

(60) Provisional application No. 63/412,523, filed on Oct. 2, 2022.

(51) Int. Cl.
*G06F 1/10*    (2006.01)
*G06F 1/08*    (2006.01)
*G06F 1/14*    (2006.01)

(52) U.S. Cl.
CPC ..................................... *G06F 1/14* (2013.01)

(58) Field of Classification Search
CPC ..................... G06F 1/10; G06F 1/08
See application file for complete search history.

(56) References Cited

U.S. PATENT DOCUMENTS

| | | | |
|---|---|---|---|
| 3,428,861 A | 2/1969 | Zinsmeyer | |
| 4,213,062 A | 7/1980 | Jespersen | |
| 5,926,441 A | 7/1999 | Zinsmeyer et al. | |
| 6,160,352 A * | 12/2000 | Steinel | H05B 47/11 315/159 |
| 9,429,962 B2 | 8/2016 | Matsuoka | |
| 2003/0025400 A1 | 2/2003 | Hall | |
| 2006/0146652 A1 | 7/2006 | Huizi et al. | |
| 2010/0295455 A1* | 11/2010 | Reed | H05B 47/16 315/152 |
| 2012/0249017 A1* | 10/2012 | Grady | H05B 47/16 315/360 |
| 2014/0166447 A1 | 6/2014 | Thea et al. | |

(Continued)

FOREIGN PATENT DOCUMENTS

WO    2014105223 A1    7/2014

*Primary Examiner* — Phil K Nguyen
(74) *Attorney, Agent, or Firm* — Dugan & Dugan, PC

(57) ABSTRACT

Programmable control devices that rely on time-of-day accuracy maintain that accuracy by determining their location via a global positioning system, recording and time-stamping continually measured ambient light via a daylight sensor and real-time clock (RTC) of the programmable control device, determining a mid-darkness time point, comparing that mid-darkness time point with a reference mid-darkness time point for the same location for the same day of the year, and then adjusting the RTC of the programmable control device as necessary. Methods of maintaining time of day in a programmable control device are also provided, as are other aspects.

20 Claims, 5 Drawing Sheets

(56) References Cited

U.S. PATENT DOCUMENTS

2017/0055324 A1\* 2/2017 Reed ...................... H05B 47/16
2018/0139913 A1\* 5/2018 Baldwin .............. A01G 25/165
2021/0328498 A1\* 10/2021 King ........................ H02B 1/42

\* cited by examiner

LOCAL TIME DETERMINATION VIA DAYLIGHT SENSING FOR PROGRAMMABLE CONTROL DEVICES

CROSS-REFERENCE TO RELATED APPLICATION

This claims the benefit of U.S. Provisional Patent Application No. 63/412,523, filed Oct. 2, 2022, titled "LOCAL TIME DETERMINATION VIA DAYLIGHT SENSING FOR PROGRAMMABLE CONTROL DEVICES", the disclosure of which is hereby incorporated by reference herein in its entirety for all purposes.

FIELD

The invention relates to programmable control devices and, more particularly, to maintaining the correct time of day kept by such devices.

BACKGROUND

Programmable control devices may be an integrated part of and/or may be used to control the operation of energy-consuming devices and/or systems based on the time of day. For example, programmable lighting control devices may automate the operation of lighting devices (e.g., luminaires) based on daylight sensing and/or preset time schedules. That is, programmable lighting control devices may automatically control the on/off operation and light level output of, e.g., outdoor lighting for buildings, streets, transit hubs, parking areas, etc. The automated lighting operation may be based on daily lighting changes (e.g., dawn and dusk) and scheduled activities (e.g., employee shift changes, arrival/departure times, closing times, etc.). For example, a programmable lighting control device may turn off outdoor lighting at a manufacturing facility at dawn and turn on the outdoor lighting at dusk to a lighting level of, e.g., 70% brightness. Later, from, e.g., 11:30 pm to 12:30 am during an employee shift change, the lighting control device may increase the lighting level to 100% brightness. Thereafter, when little to no outdoor activity is expected around the manufacturing facility, the lighting control device may decrease the lighting level to 40% brightness until dawn. Such use of programmable lighting control devices can result in significant energy savings.

A programmable lighting control device typically includes a daylight sensor (e.g., a photocell and related circuitry) and a real-time clock (RTC). The daylight sensor senses ambient light, and the RTC allows the lighting control device to be programmed with scheduled lighting changes based on the time of day. However, even the most accurate RTCs may still lose accuracy over time. Accuracy of RTCs (more particularly, their oscillators) may be specified in "ppms" (parts per million). Known RTC's may have an accuracy ranging from about 20 ppm to 50 ppm, which may result in a time drift of about +/−52-130 seconds per month. After just a few years, the RTC may be out of sync with the actual time by 30 minutes or more. Thus, a scheduled lighting change for a scheduled activity (e.g., employee shift change) will also be out of sync by 30 minutes or more. Additionally, RTCs need a way to maintain time through a power outage. Typically, this is accomplished via a battery, capacitor, or other energy storage device which acts as a backup power supply for the RTC when the normal power supply is not present. These energy storage devices add to the initial cost of products which include an RTC and have a limited life, which either causes the user to incur an ongoing service requirement which can be prohibitive for devices mounted in inconvenient or inaccessible locations or limits the useable life of the product.

Accordingly, a need exists to maintain the accuracy of RTCs in programmable control devices that depend on the correct time of day.

SUMMARY

According to one aspect, a method of maintaining time of day in a programmable control device is provided. The method comprises the following: receiving present month-day and time of day values to set a real-time clock (RTC) of the programmable control device; determining a location of the programmable control device via a global positioning system (GPS); recording and timestamping continually measured ambient light with a daylight sensor of the programmable control device and the RTC; determining a mid-darkness time point during a dusk-to-dawn period averaged over a predetermined number of days with a processor of the programmable control device; comparing via a lookup table and the processor the mid-darkness time point with a reference mid-darkness time point corresponding to the location and the present month-day; and resetting the RTC with the processor in response to the comparing indicating a discrepancy between the mid-darkness time point and the reference mid-darkness time point.

According to another aspect, a method of resetting a real-time clock (RTC) in a programmable control device after a power outage upon restoration of power is provided. The method comprises the following: recording and time-stamping measured ambient light with the RTC and a daylight sensor of the programmable control device; determining a dusk time point and a dawn time point with a processor of the programmable control device based on the recording and timestamping; identifying with the processor two days of a year having identical dusk and dawn time points; determining with the processor whether night length is increasing or decreasing based on the recording and timestamping; resetting with the processor the RTC with a month-day based on the determining of increasing or decreasing night length; and resetting with the processor the RTC with time of day based on the dusk time point and the dawn time point.

According to a further aspect, a programmable control device is provided. The programmable control device comprises a processor and a memory or firmware coupled to the processor, wherein the memory or the firmware comprises computer instructions executable by the processor. The programmable control device also includes a transceiver, a real-time clock (RTC), and a daylight sensor each coupled to the processor. The processor, executing the computer instructions, is operative to perform the following: set the RTC to present month-day and time of day in response to receiving present month-day and time of day values; determine a location of the programmable control device via a global positioning system (GPS) in communication with the programmable control device via the transceiver; record and timestamp continually measured ambient light with the daylight sensor and the RTC; determine a mid-darkness time point during a dusk-to-dawn period averaged over a predetermined number of days; compare via a lookup table the mid-darkness time point with a reference mid-darkness time point corresponding to the location and the present month-day; and reset the RTC in response to the comparing indicating a discrepancy between the mid-darkness time point and the reference mid-darkness time point.

Still other aspects, features, and advantages of the methods and devices disclosed herein may be readily apparent from the following detailed description and illustration of a number of example embodiments and implementations, including the best mode contemplated for carrying out the invention. This disclosure may also be capable of other and different embodiments, and its several details may be modified in various respects, all without departing from the scope of the invention. For example, although described hereinafter with respect to programmable lighting control devices, this disclosure may be applicable to other programmable control devices that rely on the accuracy of their RTC. Accordingly, this disclosure is intended to cover all modifications, equivalents, and alternatives falling within the scope of the appended claims (see further below).

BRIEF DESCRIPTION OF DRAWINGS

The drawings described below are for illustrative purposes and are not necessarily drawn to scale. Accordingly, the drawings and descriptions are to be regarded as illustrative in nature, and not as restrictive. The drawings are not intended to limit the scope of the invention in any way.

DETAILED DESCRIPTION

Programmable lighting control devices in accordance with one or more embodiments allow a user to easily and conveniently program the control device to operate lighting at selected light levels at selected times of the day. The programmable lighting control device may include or be part of, or may be connected to, one or more lighting devices, such as, e.g., one or more LED (light emitting diode) luminaires used for building entrances/exits, street lighting, public spaces, parking areas, etc. A user may, e.g., program a programmable lighting control device to turn on lighting at an outdoor space at a 100% brightness level at 6:30 pm for a scheduled event and then decrease the lighting level to a 50% brightness level at 11:00 pm after the event.

Figure 1:
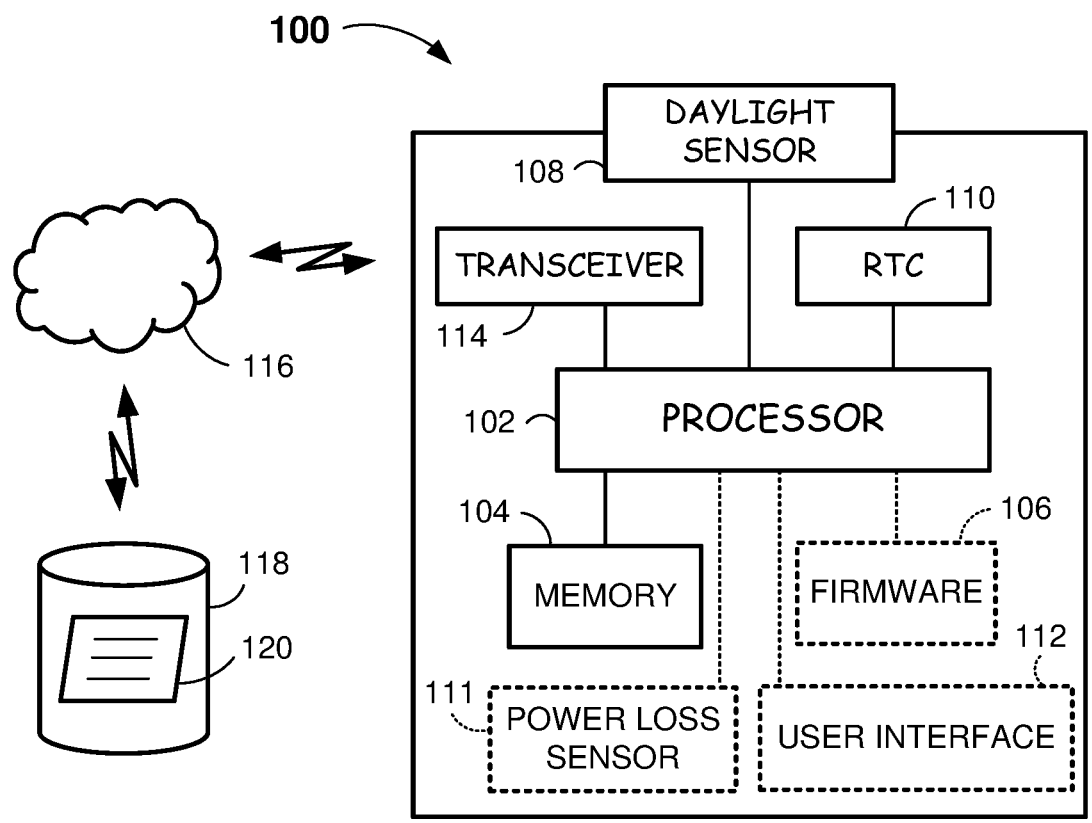
FIG. 1 illustrates a programmable lighting control device according to embodiments.

FIG. 1 illustrates a programmable lighting control device in accordance with one or more embodiments. Programmable lighting control device 100 may include a processor 102, a memory 104, optional firmware 106, a daylight sensor 108, a real-time clock (RTC) 110, optional power loss sensor 111, optional user interface 112, and a wireless transceiver 114. Processor 102 may be, e.g., a microcontroller, microprocessor, or other suitable computer processing component. Memory 104 may be non-volatile and may include computer instructions executable by processor 102. Optional firmware 106 may also include computer instructions executable by processor 102. Daylight sensor 108 may include a photocell and related electrical circuitry operative to measure ambient light. RTC 110 may include an oscillator and may be battery powered, powered by a combination of an external power supply and energy storage device, or powered by an internal or external power supply (not shown). RTC 110 maintains the actual date and time of day within a specified accuracy of its oscillator. In some embodiments, RTC 110 may have an accuracy of 20-50 ppms. Optional user interface 112 may include any suitable input/output devices (e.g., a keyboard, keypad, pushbuttons, touch screen, display screen, etc.) that allow a user to enter commands and information requests and to receive status, information, data, etc. Transceiver 114 is operative to communicate with other devices either directly or via a network 116. Network 116 may be the Internet or any other suitable network (e.g., an intranet, extranet, local area network, wide area network, etc.). Transceiver 114 and network 116 may use either wired or wireless communication.

Programmable lighting control devices in accordance with one or more embodiments are operative to accurately maintain the time of day provided by their RTCs. In one embodiment, a programmable lighting control device may accurately maintain the time of day provided by its RTC by establishing its location via GPS (global positioning system) and recording and timestamping measured ambient light levels throughout the day via its daylight sensor and RTC. The GPS receiver (not shown) may be a component of a connected device on network 116 or included in programmable lighting control device 100. The location may be stored in a non-volatile memory (e.g., memory 104) of programmable lighting control device 100 for later retrieval. In some embodiments, the location may be entered manually (e.g., as longitude and latitude coordinates) via optional user interface 112 or via a device on network 116. Processor 102 (via execution of computer instructions stored in memory or firmware) may then determine the time at which mid-darkness (between dusk and dawn) occurs. This determination may be made by averaging the determined mid-darkness time points over several days.

For example, in one embodiment, the mid-darkness time point may be determined as follows: record and timestamp measured ambient light levels continually throughout a 24-hour period. A dusk-to-dusk length is considered valid if within +/−30 minutes of 24 hours, wherein "dusk" may be defined as the measured light level point (e.g., 0.9 footcandles) that triggers the turn-on of artificial light as measured light levels decrease thereafter. If the dusk-to-dusk time period exceeds 24.5 hours, it is set back 30 minutes and the process continues. Within a valid dusk-to-dusk time period, a dusk-to-dawn time period is considered valid if it is within min-max limits of 3-21 hours and within +/−30 minutes of a previous day's valid dusk-to-dawn time period. These limits may be set to different values in some applications. "Dawn" may be defined as the measured light level point (again, e.g., 0.9 footcandles) that triggers the turn-off of artificial light as measured light levels increase thereafter. A mid-darkness time point may then be determined by averaging valid dusk-to-dawn time periods over a predetermined number of days (e.g., 3-10 days), dividing that time period by two, and adding that time to the next time determined to be dusk.

The determined mid-darkness time point may be considered "apparent solar time." However, "apparent solar time" varies during the year from the actual time, which may be referred to as "mean solar time." Mean solar time is determined by measuring the length of each day (e.g., dusk-to-dusk) via a daylight sensor (these are apparent solar time measurements) and averaging those measurements over one year—the result is 24 hours (mean solar time) upon which "actual time" is based. The daily variations between apparent solar time and mean solar time may be as much as +/−15 minutes due to the shape and tilt of the earth's elliptical orbit during the year. These daily variations may depend further on the location at which the apparent solar time measurements are made by the daylight sensor. That is, the daily variation may not be the same for every location on earth.

Figure 2:
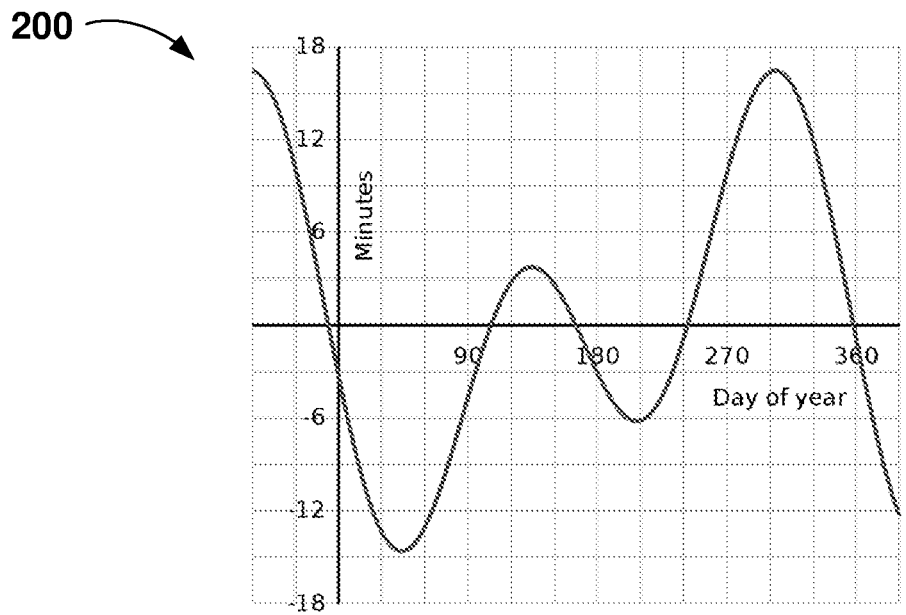
FIG. 2 illustrates a graph of the differences in the number of minutes per day during the year.

FIG. 2 illustrates graphically this daily variation between apparent solar time and the actual time (mean solar time) over a one-year period. As shown, each "solar day" as measured (in apparent solar time) by a daylight sensor is not exactly 24 hours on all but four days of the year.

To compensate for both any drift in the RTC and for any variation between the determined apparent solar time and the mean solar time (i.e., the actual time), the processor (via execution of computer instructions stored in the memory or firmware) compares the determined apparent solar time to known pre-established reference mid-darkness time points for that day of the year and for the particular location of the programmable lighting control device 100 as determined by a GPS. Processor 102 may access a database 118 and retrieve therefrom known pre-established reference mid-darkness time points per day per location (as identified by, e.g., longitude and latitude coordinates) via transceiver 114 and network 116. In some embodiments, database 118 may be directly accessible by programmable lighting control device 100 via transceiver 114. In other embodiments, relevant entries from database 118 may be downloaded to memory 104 of programmable lighting control device 100, found in the firmware of programmable lighting control device 100, or calculated in programmable lighting control device 100 on startup. The pre-established reference mid-darkness time points may be embodied, e.g., as a lookup table 120. If a discrepancy is found between a corresponding reference mid-darkness time and the determined mid-darkness time, the processor may reset the RTC in accordance with the amount of the discrepancy. Note that, alternatively, measurements for determining mid-day time points during dawn-to-dusk periods may be used instead of mid-darkness time points.

Figure 3:
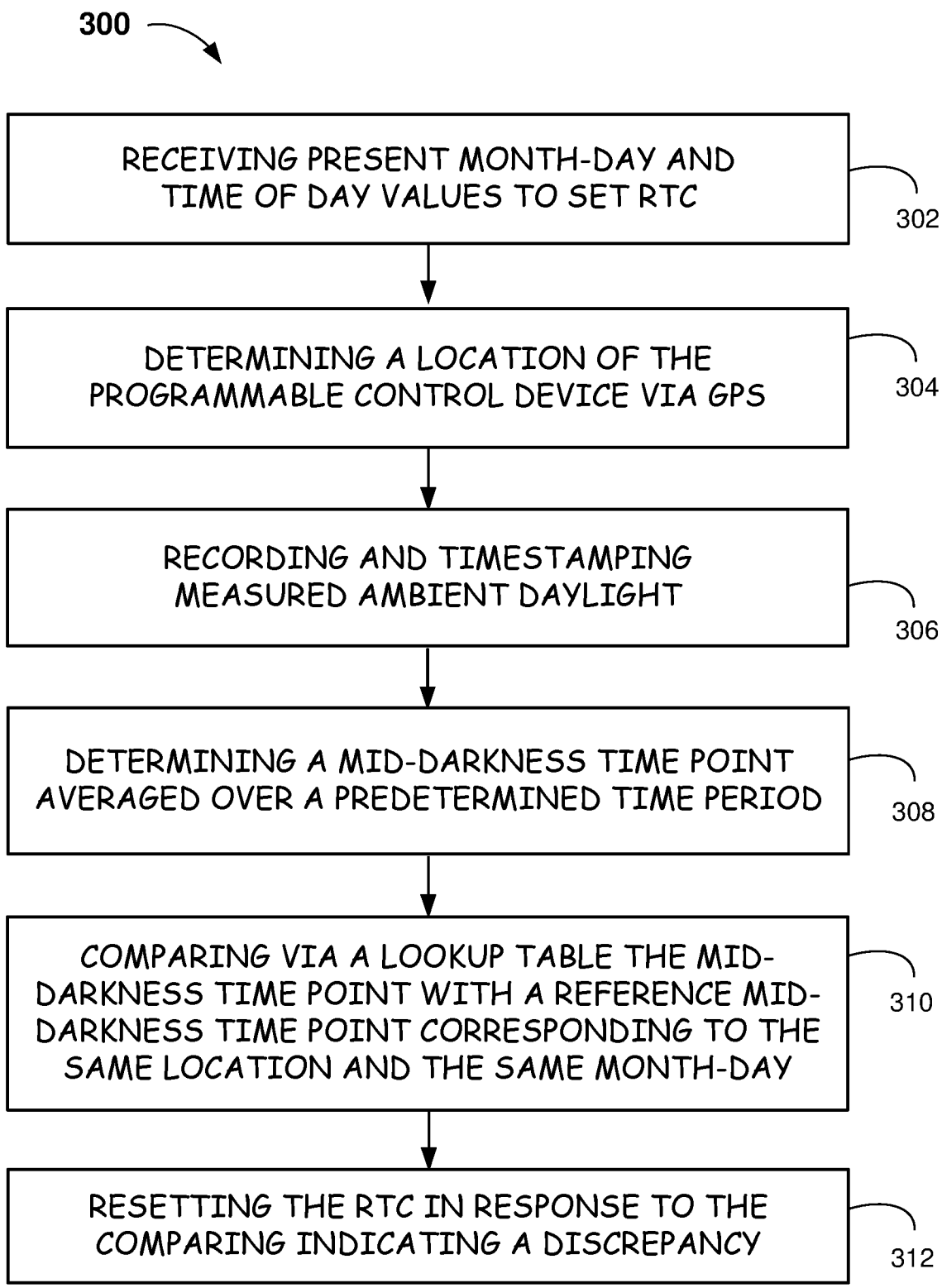
FIG. 3 illustrates a flowchart of a method of maintaining time of day in a programmable control device according to embodiments.

FIG. 3 illustrates a method 300 of maintaining time of day in a programmable control device in accordance with one or more embodiments. The programmable control device may be, e.g., programmable lighting control device 100 which may be operative to control lighting at selected lighting levels at one or more selected times during a day. At process block 302, method 300 may include receiving present month-day and time of day values to set a real-time clock (RTC) of the programmable control device. For example, as shown in FIG. 1, programmable lighting control device 100 may receive present month-day and time of day values from a user via user interface 112 or from a remote device in communication with programmable control device 100 via transceiver 114.

At process block 304, method 300 may include determining a location of the programmable control device via a global positioning system (GPS). The location may be identified by GPS coordinates (e.g., longitude and latitude).

At process block 306, method 300 may include recording and timestamping measured ambient light level values with a daylight sensor of the programmable control device and the RTC. For example, referring to FIG. 1, measurements of ambient light may be made by daylight sensor 108, timestamped by RTC 110, and stored in memory 104. In some embodiments, the recording and timestamping of measured ambient light level values may be performed continually or periodically (e.g., every 10 minutes or other suitable intervals).

At process block 308, method 300 may include determining a mid-darkness time point during a dusk-to-dawn period averaged over a predetermined number of days. The determination of a mid-darkness time point may be performed by processor 102 and stored in memory 104 of FIG. 1. In some embodiments, the predetermined number of days may be seven days. In other embodiments, the predetermined number of days may range from 2 to 10 days.

At process block 310, method 300 may include comparing via a lookup table the mid-darkness time point with a reference mid-darkness time point corresponding to the (same) location and the present (same) month-day. In some embodiments, the lookup table may be lookup table 120 residing in a database 118 accessible via a network 116 as shown in FIG. 1. In other embodiments, the lookup table may reside in a storage device directly accessible via transceiver 114 or in memory 104.

And at process block 312, method 300 may include resetting the RTC in response to the comparing indicating a discrepancy between the mid-darkness time point and the reference mid-darkness time point. The resetting may be performed by processor 102 of FIG. 1 and may include determining a numerical difference between the mid-darkness time point and the reference mid-darkness time point, and applying the numerical difference (i.e., adding or subtracting) to the time of day of the RTC.

Note that in some embodiments, method 300 or portions thereof may be implemented as a computer program product or software that may include a machine-readable medium having non-transient instructions stored thereon. The instructions may be used to program a computer system, controller, or other electronic device to perform method 300 or portions thereof in accordance with one or more embodiments.

Programmable lighting control devices in accordance with one or more embodiments are also advantageously operative to compensate for certain disadvantaged placements at locations where programmable lighting control devices are installed that can adversely affect the light level sensing performed by the daylight sensor. For example, a programmable lighting control device may be placed such that the daylight sensor is on a west side of a large north-south wall. Such a placement may cause a shadow that will distort the daylight sensor readings of dawn, which may seem to occur later than in actuality. These distorted readings may result in an offset of the mid-darkness time point determinations. Other disadvantaged placements of the daylight sensor, such as, e.g., adjacent to a highly reflective building, may result in distorted readings of dusk, which may also result in an offset of the mid-darkness time point determinations.

To compensate for such offsets caused by various disadvantaged placements of the daylight sensor, programmable lighting control devices according to one or more embodiments may be programmed with training data that allows the processor to appropriately adjust the determined mid-darkness time points. That is, prior to, or concurrently with the installation of a programmable lighting control device at a site which may cause distorted daylight sensor readings, a training control device may be temporarily placed at or near the same location, but with no obstructed daylight sensing. That is, the temporary placement of the training control device should provide its daylight sensor with an unobstructed field of view (e.g., no obstructions blocking or reflecting sunlight or casting shadows). For example, the temporary placement site may be on the roof of a building above or near the intended installation site. The temporary placement should be near enough to the intended installation site such that the respective reference mid-darkness time points for the temporary placement site and the intended installation site are substantially the same (e.g., within 0.5 seconds or less of each other). In some embodiments, the training control device may be within a 1000-foot radius of the intended installation site. In some embodiments, the training control device may simply be another programmable lighting control device which is permanently mounted (e.g., on another luminaire) in a more advantageous location. The training control device may be configured identically as programmable lighting control device 100. In particular, the training control device should have an RTC with the same accuracy rating as the RTC in the programmable lighting control device to be installed.

The training control device, starting from an accurate month-day and time, may be operated from the temporary placement site for a period of time (e.g., from six months to one year or longer) to continually measure, timestamp, and store ambient light level measurements with its daylight sensor and RTC. The processor of the training control device may calculate and store for each day a time for dusk and a time for dawn as described above. Then for each day at the calculated time of dusk and dawn, record the light level measured by the daylight sensor. In one embodiment, during the first year, a trailing 7-day average is calculated, and an average value is stored for each week. In future years, the previous seven days are averaged with the stored value for that week from the previous year. These values can then be stored in the memory of the programmable lighting control device located at the intended installation site and used by its processor to compensate for offsets caused by the disadvantaged placement of the daylight sensor at the intended installation site. In some embodiments, the training control device advantageously may be battery powered to avoid any power supply failures or public utility power outages during the training period.

Programmable lighting control devices in accordance with one or more embodiments are also operative to reset the RTC in the event of a power loss to the RTC. Such a power loss may result from a discharged battery (if the RTC is powered by a battery) or from a power supply failure of the programmable lighting control device or a public utility power outage.

Figure 4:
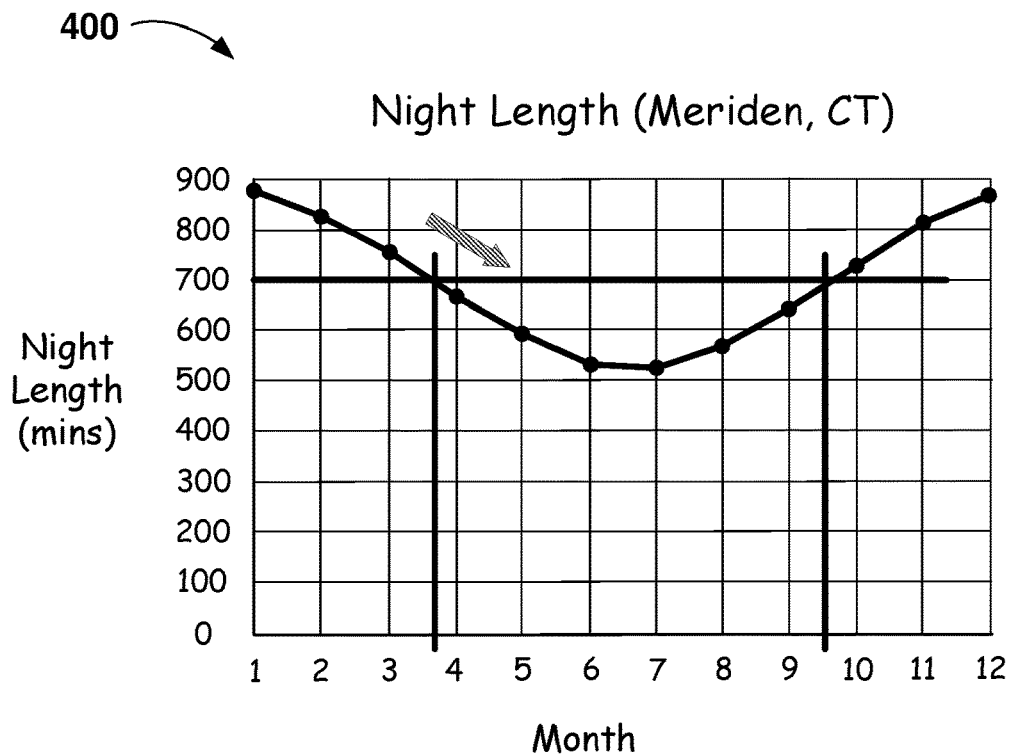
FIG. 4 illustrates a graph of night length in the northern hemisphere over a one-year period.
Figure 5:
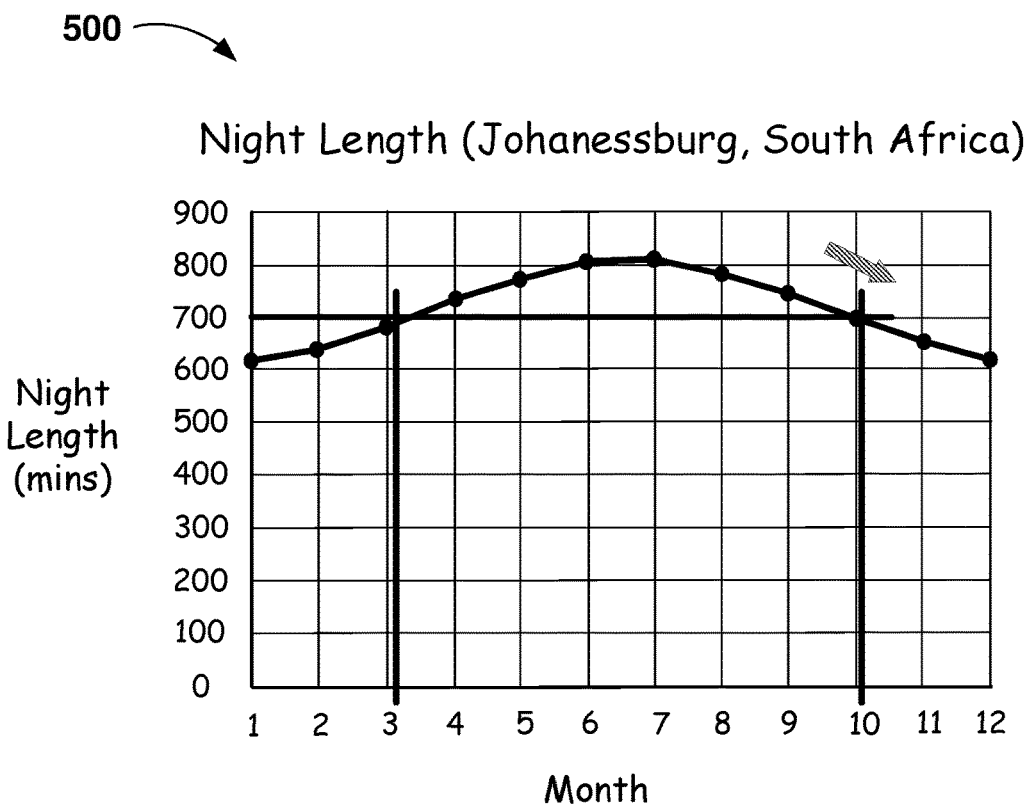
FIG. 5 illustrates a graph of night length in the southern hemisphere over a one-year period.

In one embodiment, resetting the RTC after replacement of a discharged battery includes the processor (executing computer instructions stored in the memory or firmware) of the programmable lighting control device measuring the length of the night (referred to hereinafter as "night length") over several days and then averaging the results. The average is then used to search for matching night lengths from night length data either calculated by the programmable lighting control device upon startup (based on the GPS coordinates of the programmable lighting control device and known equations) or retrieved from a known database (wherein the night length data may be stored in, e.g., lookup table form). Two days of the year should result from that search, as illustrated in the graphs of FIGS. 4 and 5. FIG. 4 illustrates night length over a one-year period for the northern hemisphere, and FIG. 5 illustrates corresponding night length over a one-year period for the southern hemisphere. Note that the two days should be mirrored around the longest day of the year for that geographic location.

Next, the processor determines whether the night length is increasing or decreasing over time using measurements taken over several days. For example, assume the determined night length is 700 minutes. Using, e.g., a lookup table of reference night lengths for the location of the programmable lighting control device, that night length could occur on a day in the spring or the fall. If the location is in the northern hemisphere (e.g., Meriden, Connecticut, USA), FIG. 4 may be used. If the location is in the southern hemisphere (e.g., Johannesburg, South Africa), FIG. 5 may be used. Thus, based on the location and a determined increasing or decreasing night length, a month-day for the RTC can then be reset and the time for the RTC can be reset for the next dawn time upon measurement of the light level corresponding to the next dawn.

During the RTC reset process described above, to avoid issues with cloudy days that may distort the light level measurements, the processor may check that the most recent measured light level is within a certain range of the averaged measured light levels. If not, that particular light level measurement is discarded.

Figure 6A:
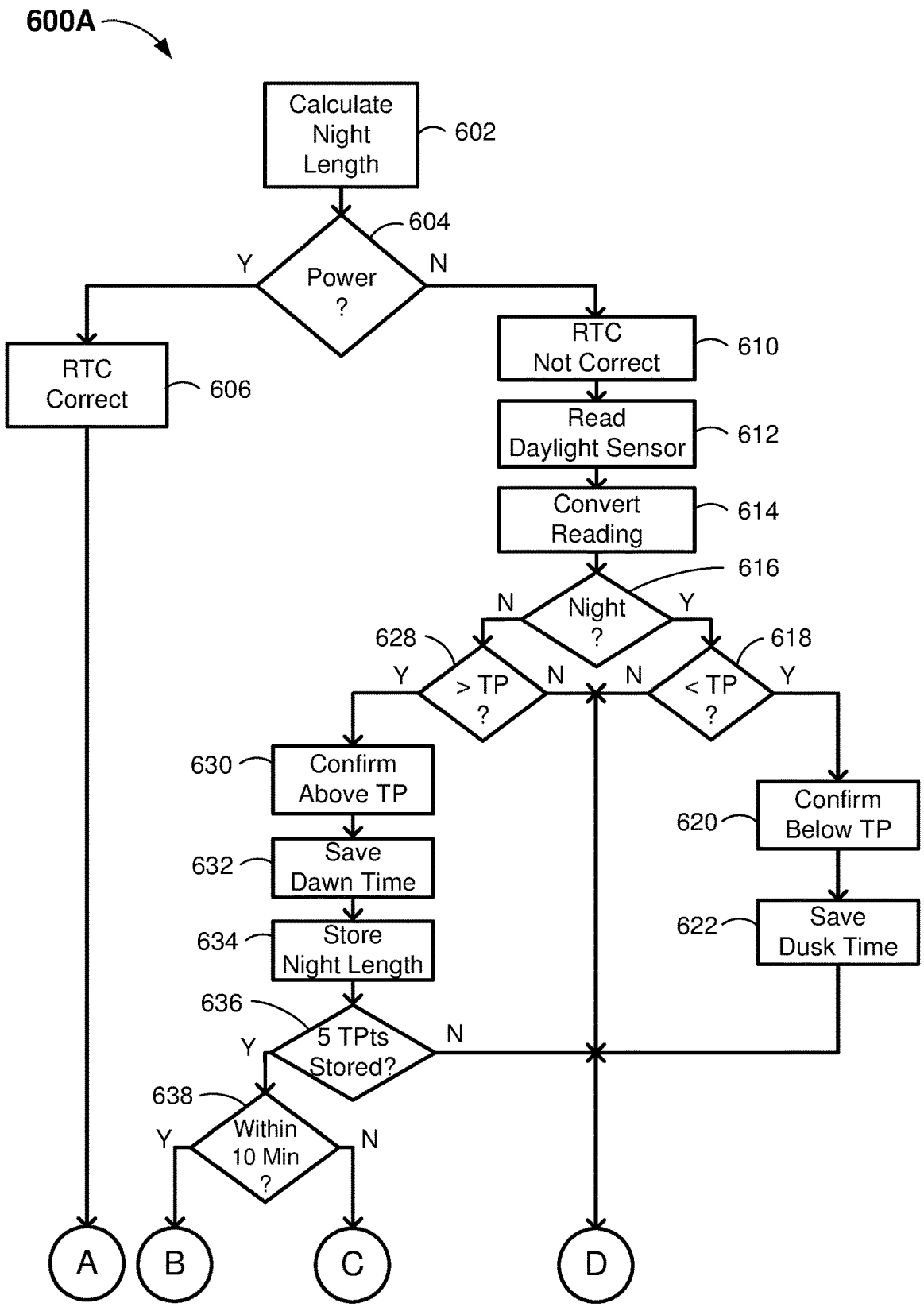
FIGS. 6A and 6B illustrate a flowchart of a method of resetting a real-time clock after a battery is replaced according to embodiments.
Figure 6B:
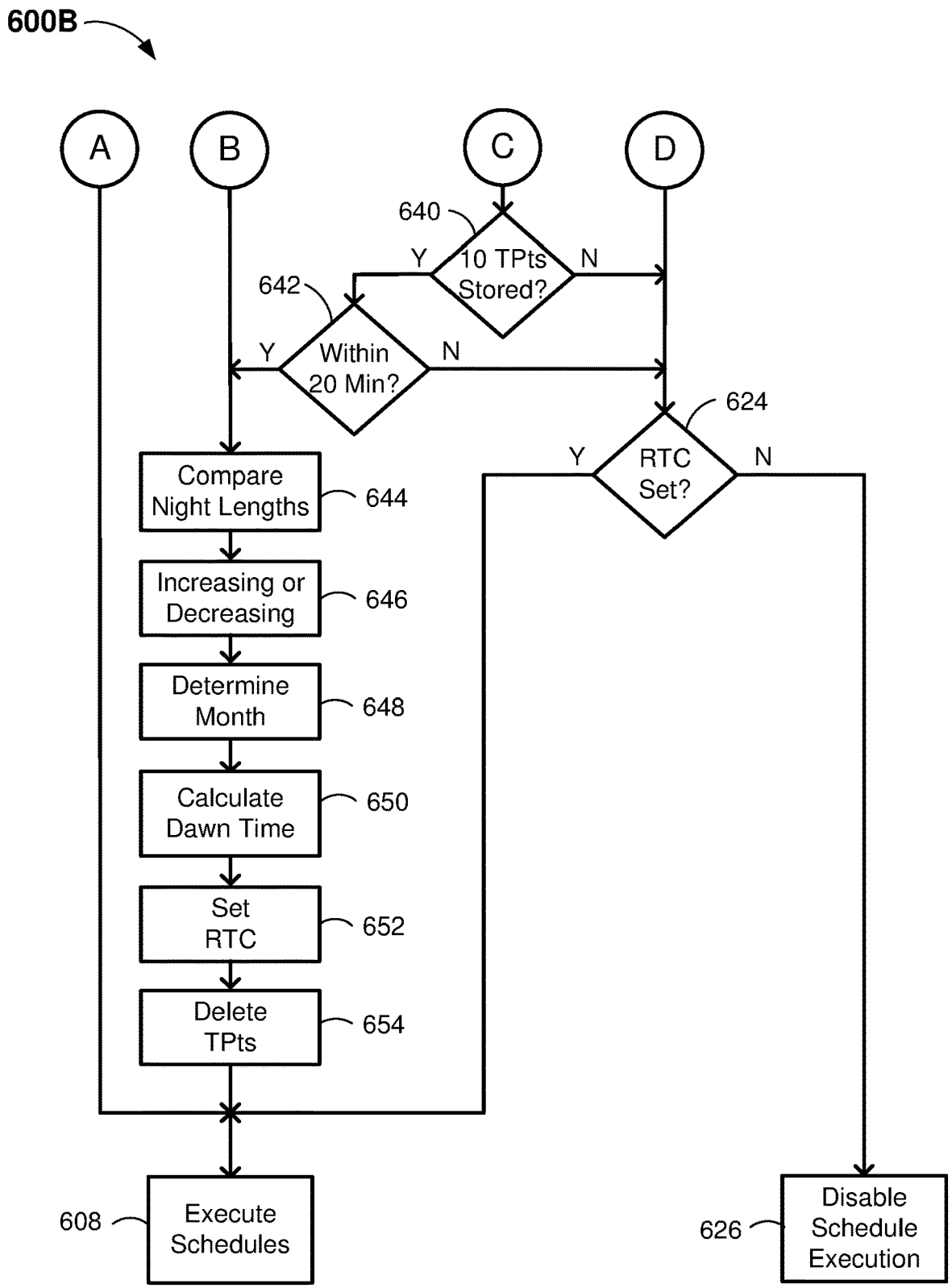

FIGS. 6A and 6B illustrate a method 600A/600B of resetting a real-time clock of a programmable lighting control device after a battery is replaced in accordance with one or more embodiments. At process block 602 (FIG. 6A), the programmable lighting control device may calculate night length based on location coordinates (e.g., GPS or other suitable coordinates) and known equations for every day of the year on startup of the programmable lighting control device. In other embodiments, the programmable lighting control device may download and store in its memory known lookup tables comprising this data. In still other embodiments, firmware storing such night length data for the location of the programmable lighting control device may be provided with the programmable lighting control device.

At decision block 604, the power status of the battery is determined. If the battery is determined to supply sufficient power, method 600A proceeds to process block 606, wherein the processor of the programmable lighting control device determines that the current month-day and time of the RTC is correct. Method 600A then proceeds to process block 608 of method 600B. At process block 608 (FIG. 6B), the processor executes programmed lighting schedules stored in the memory of the programmable lighting control device.

Returning to decision block 604, if the battery is determined to be discharged (i.e., dead) or supplies insufficient power, method 600A proceeds to process block 610, wherein the processor determines that the current month-day and time of the RTC is not correct. At process block 612, a daylight sensor reading is taken. At process block 614, the raw daylight sensor reading (voltage) is processed (converted) via calibration values using a known equation to a light level value (e.g., a number of lumens). At decision block 616, the processor determines whether the daylight sensor reading indicates night. If the determination is yes, method 600A proceeds to decision block 618, which determines whether the sensor reading is less than a trigger point (TP). If the determination is yes, method 600A proceeds to process block 620, which confirms that sensor readings have settled consistently below the trigger point. At process block 622, the dusk time as based on the incorrect time of the RTC is saved. At decision block 624 (FIG. 6B), the processor determines if the RTC has ever been set by daylight sensor readings. If not, the processor, at process block 626, disables execution of any programmed lighting schedules stored in the memory and instead operates the programmable lighting control device in an on/off mode based on daylight sensor readings only.

Returning to decision block 624, if the processor determines that the RTC has been set by daylight sensor readings, method 600B proceeds to process block 608, where the processor executes programmed lighting schedules stored in memory.

Returning to decision block 618 (FIG. 6A), if the determination is that the current sensor reading is greater than or equal to the trigger point, method 600A proceeds to decision block 624 (FIG. 6B) (described above).

Returning to decision block 616 (FIG. 6A), if the processor determines that the current sensor reading does not indicate night, method 600A proceeds to decision block 628, which determines whether the sensor reading is greater than the trigger point (TP). If the determination is no, method 600A proceeds to decision block 624 (described above). If the determination is yes, method 600A proceeds to process block 630, which confirms that sensor readings have settled consistently above the trigger point. At process block 632, the dawn time as based on the incorrect time of the RTC is saved. At process block 634, the night length is stored as a time point (TPt) in the memory. At decision block 636, the processor determines whether there are five or more time points (TPts) stored in the memory. If the processor determines that there are less than five time points stored, method 600A proceeds to decision block 624 (described above). If the processor determines that there are five or more time points stored, method 600A proceeds to decision block 638, which determines whether the latest sensor reading is within 10 minutes of the average sensor readings. If the processor determines that the latest sensor reading is not within 10 minutes, method 600A proceeds to decision block 640 of method 600B, wherein the processor determines whether there are 10 or more time points (TPts) stored in the memory. If not, method 600B proceeds to decision block 624 (described above). If there are 10 or more time points stored, method 600B proceeds to decision block 642, which determines whether the latest sensor reading is within 20 minutes of the average sensor readings. If the processor determines that the latest sensor reading is not within 20 minutes, method 600B proceeds to decision block 624 (described above).

If the latest sensor reading is within 20 minutes, method 600B proceeds from decision block 642 to process block 644, where the average night length is compared to known reference average night lengths to determine two possible dates that correspond thereto. The known reference average night lengths may be calculated by the programmable lighting control device upon startup, stored in a database accessible by the programmable lighting control device (similar to database 118 of FIG. 1), downloaded to the memory of the programmable lighting control device from a database, or found in firmware of the programmable lighting control device.

At process block 646, the processor determines whether the night length is increasing or decreasing over the sensor readings taken by the daylight sensor. At process block 648, the month is determined based on the location of the programmable lighting control device (e.g., via GPS) and in which half of the year the night length is determined to be increasing or decreasing. At process block 650, a dawn time is calculated for that month-day. At process block 652, the RTC is set to the calculated dawn time upon the daylight sensor sensing a light level value corresponding to dawn on that month-day. At process block 654, saved time points (TPts) are deleted from the memory such that the process repeats. From process block 654, method 600B proceeds to process block 608 (described above).

Returning to decision block 638 (FIG. 6A), if the processor determines that the latest sensor reading is within 10 minutes of the average sensor readings, method 600A proceeds to process block 644 of method 600B (FIG. 6B) (described above).

Note that in some embodiments, method 600A/600B or portions thereof may be implemented as a computer program product or software that may include a machine-readable medium having non-transient instructions stored thereon. The instructions may be used to program a computer system, controller, or other electronic device to perform method 600A/600B or portions thereof in accordance with one or more embodiments.

In an alternative embodiment, an RTC may be reset after a power loss as follows: Upon a loss of power, a power monitoring component (e.g., power loss sensor 111 of FIG. 1) in the programmable lighting control device, which may include, e.g., a capacitor and associated electrical circuitry, may sense the loss of power (via, e.g., a voltage drop to a predetermined level) that triggers the storing in the memory of the most recent month-day. Upon restoration of power, the processor may execute an RTC reset algorithm stored in the memory that monitors daylight sensing measurements to identify an event (e.g., dusk or dawn) that matches the most recent 7-day average stored in memory, noting measured light levels and whether the measured 7-day average is on a positive or negative slope, which along with location of the programmable lighting control device indicates the time of year. The identified event is then used to reset the RTC. For example, assume a stored recent average indicates that dawn for that day measured 0.8 footcandles at 6:05 am. Upon the daylight sensor first measuring 0.8 footcandles after restoration of power, the processor resets the RTC to 6:05 am. The processor, continuing to execute the RTC algorithm, then verifies that light measurements continue to increase after 6:05 am. If not, the identified event is ignored, and the processor continues to monitor the light level measurements to identify a next event that matches the most recent 7-day average stored in memory. If the processor verifies that light measurements continue to increase after 6:05 am, the processor monitors the light level measurements to identify the next event (e.g., dusk). Upon identifying the next event, the processor compares the timestamp of the event with the calculated time of the event. If there is a discrepancy, the processor resets the RTC by half of the discrepancy between the timestamp and the calculated time. Each calculation may be an average of the light level measurements taken over a predetermined number of previous days, which in some embodiments, may range from a few days (resulting in less accuracy) to weeks or more (resulting in more accuracy).

Programmable lighting control devices in accordance with one or more embodiments may also be operative to automatically reset the RTC in cases where the month-day has not been stored upon a power loss. Using a previously determined daylight sensing threshold (e.g., 0.9 footcandles), the RTC may be started upon the daylight sensor first sensing 0.9 footcandles, wherein the RTC is set to dawn time for that location. The programmable lighting control device continues monitoring the light measurements thereafter to determine whether light levels are increasing (indicating that the sensed 0.9 footcandles was dawn) or decreasing (indicating that the sensed 0.9 footcandles was dusk). Next, length of darkness (i.e., night length) is determined and then whether the length of darkness is increasing or decreasing (which indicates the time of year). Upon determination of whether the length of darkness is increasing or decreasing, the month-day can be determined by comparison to calculated/lookup table values. The RTC may be adjusted daily as described above for determining the mid-darkness time point. The length of darkness may then be averaged over the previous N days (wherein N is not greater than seven) to adjust the date daily. The date may be adjusted by one half the discrepancy between the measured and calculated/looked-up time values. After a predetermined number of days without a date adjustment (e.g., seven days), the date is assumed to be correct, and the processor may begin adjusting the RTC as described above for the embodiments in which the most recent month-day had been stored in memory upon the sensing of the power loss.

In another embodiment, an RTC may be reset after a power loss as follows: Upon a power loss, a power monitoring component (e.g., power loss sensor 111 of FIG. 1) in the programmable lighting control device, which may include, e.g., a capacitor and associated electrical circuitry, senses the loss of power (via, e.g., a voltage drop to a predetermined level) that triggers the storing in memory of the current month-day and the time. A capacitor with a very slow discharge rate (e.g., 3-5 days) and associated circuitry may be used to measure the length of the power outage. That is, upon restoration of power, the current voltage across the capacitor is measured and used to determine, via known discharge data of the capacitor (e.g., discharge time versus capacitor voltage) stored in the memory, the length of time of the power outage. The RTC can then be reset to the current month-day and time by adding the determined time of the power outage to the stored current month-day and time. An additional calibration algorithm stored in the memory may be executed by the processor to compensate for any known capacitor voltage drift and/or temperature effects that may affect the discharge rate of the capacitor.

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure but to the contrary cover all modifications, equivalents, and alternatives falling within the scope of the claims.

What is claimed is:

1. A method of maintaining time of day in a programmable control device, the method comprising:
   receiving present month-day and time of day values to set a real-time clock (RTC) of the programmable control device;
   determining a location of the programmable control device via a global positioning system (GPS);
   recording and timestamping measured ambient light with a daylight sensor of the programmable control device and the RTC;
   determining a mid-darkness time point during a dusk-to-dawn period averaged over a predetermined number of days with a processor of the programmable control device;
   comparing via a lookup table and the processor the mid-darkness time point with a reference mid-darkness time point corresponding to the location and the present month-day; and
   resetting the RTC with the processor in response to the comparing indicating a discrepancy between the mid-darkness time point and the reference mid-darkness time point.

2. The method of claim 1 wherein the receiving the present month-day and time of day values comprises receiving the present month-day and time of day values via either a remote device in communication with the programmable control device or a user interface of the programmable control device.

3. The method of claim 1 wherein the location comprises GPS coordinates.

4. The method of claim 1 wherein the predetermined number of days ranges from two days to one or more weeks.

5. The method of claim 1 wherein the look-up table is:
   stored remote from the programmable control device and is accessible to the programmable control device via a communication network;
   stored in a memory of the programmable control device;
   located in firmware of the programmable control device; or
   calculated by the processor of the programmable control device using known equations.

6. The method of claim 1 wherein the resetting comprises:
   determining a numerical difference between the mid-darkness time point and the reference mid-darkness time point; and
   applying the numerical difference to the time of day of the RTC.

7. The method of claim 1 further comprising repeating the determining, the comparing, and the resetting at a regular interval.

8. The method of claim 2 wherein the regular interval is 24 hours.

9. The method of claim 1 wherein the programmable control device comprises a lighting device programmable to provide lighting at one or more specified lighting levels at one or more specified times during a day.

10. The method of claim 1 further comprising:
    recording and timestamping measured ambient light with a daylight sensor and an RTC of a training control device at a same or nearby location as the programmable control device;
    determining a plurality of first dusk and dawn time points for a plurality of days based on the recording and timestamping; and
    determining differences between the plurality of first dusk and dawn time points and a plurality of second dusk and dawn time points determined by the programmable control device; and
    compensating the plurality of second dusk and dawn time points via the differences.

11. A method of resetting a real-time clock (RTC) in a programmable control device after a power outage upon restoration of power, the method comprising:
    recording and timestamping measured ambient light with the RTC and a daylight sensor of the programmable control device;
    determining a dusk time point and a dawn time point with a processor of the programmable control device based on the recording and timestamping;
    identifying with the processor two days of a year having identical dusk and dawn time points;
    determining with the processor whether night length is increasing or decreasing based on the recording and timestamping;
    resetting with the processor the RTC with a month-day based on the determining of increasing or decreasing night length; and
    resetting with the processor the RTC with time of day based on the dusk time point and the dawn time point.

12. A programmable control device, comprising:
a processor;
a memory or firmware coupled to the processor, the memory or the firmware comprising computer instructions executable by the processor;
a transceiver coupled to the processor;
a real-time clock (RTC) coupled to the processor; and
a daylight sensor; wherein:
the processor executing the computer instructions is operative to:
- set the RTC to present month-day and time of day in response to receiving present month-day and time of day values;
- determine a location of the programmable control device via a global positioning system (GPS) in communication with the programmable control device via the transceiver;
- record and timestamp continually measured ambient light with the daylight sensor and the RTC;
- determine a mid-darkness time point during a dusk-to-dawn period averaged over a predetermined number of days;
- compare via a lookup table the mid-darkness time point with a reference mid-darkness time point corresponding to the location and the present month-day; and
- reset the RTC in response to the comparing indicating a discrepancy between the mid-darkness time point and the reference mid-darkness time point.

13. The programmable control device of claim 12 wherein the present month-day and time of day values are received via the transceiver or a user interface of the programmable control device.

14. The programmable control device of claim 12 wherein the location is identified by GPS coordinates.

15. The programmable control device of claim 12 wherein the predetermined number of days is seven.

16. The programmable control device of claim 12 wherein the wherein the look-up table is stored remote from the programmable control device and is accessible to the programmable control device via the transceiver.

17. The programmable control device of claim 12 wherein the processor executing the computer instructions is operative to repeat at a regular interval the determine a mid-darkness time point, the compare via the lookup table, and the reset the RTC.

18. The programmable control device of claim 12 wherein the regular interval is 24 hours.

19. The programmable control device of claim 12 wherein to reset the RTC, the processor executing the computer instructions is operative to:
- determine a numerical difference between the mid-darkness time point and the reference mid-darkness time point; and
- apply the numerical difference to the time of day of the RTC.

20. The programmable control device of claim 12 further comprising a lighting device programmable to provide lighting at one or more specified lighting levels at one or more specified times during a day.

* * * * *